US010129841B2

(12) United States Patent
Amizur et al.

(10) Patent No.: US 10,129,841 B2
(45) Date of Patent: Nov. 13, 2018

(54) APPARATUS, SYSTEM AND METHOD OF COMMUNICATING TIMING SYNCHRONIZATION INFORMATION

(71) Applicant: INTEL IP CORPORATION, Santa Clara, CA (US)

(72) Inventors: Yuval Amizur, Kfar-Saba (IL); Leor Banin, Petach Tikva (IL)

(73) Assignee: INTEL IP CORPORATION, Santa Clara, CA (US)

( * ) Notice: Subject to any disclaimer, the term of this patent is extended or adjusted under 35 U.S.C. 154(b) by 92 days.

(21) Appl. No.: 15/281,090

(22) Filed: Sep. 30, 2016

(65) Prior Publication Data

US 2017/0295550 A1   Oct. 12, 2017

Related U.S. Application Data

(60) Provisional application No. 62/319,391, filed on Apr. 7, 2016.

(51) Int. Cl.
*H04W 56/00* (2009.01)
*H04W 24/08* (2009.01)
(Continued)

(52) U.S. Cl.
CPC ......... *H04W 56/001* (2013.01); *H04W 24/08* (2013.01); *H04W 88/02* (2013.01); *H04W 88/08* (2013.01)

(58) Field of Classification Search
None
See application file for complete search history.

(56) References Cited

U.S. PATENT DOCUMENTS

2010/0238917 A1* 9/2010 Silverman ............. H04J 3/0667
                                                        370/350
2013/0223427 A1* 8/2013 Sohn ..................... H04W 74/06
                                                        370/338
(Continued)

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Jeffrey M Rutkowski
*Assistant Examiner* — Andre G Tacdiran
(74) *Attorney, Agent, or Firm* — Shichrur & Co.

(57) ABSTRACT

For example, a mobile station may process a plurality of frames from a plurality of wireless stations, a frame from a wireless station including a ToD of the frame according to a local clock of the wireless station; process timing synchronization information corresponding to the plurality of wireless stations, timing synchronization information corresponding to the wireless station to indicate one or more synchronization offsets between the local clock of the wireless station and one or more other wireless stations of the plurality of wireless stations; and determine a plurality of ToF measurements between the mobile station and the plurality of wireless stations by determining a ToF measurement between the mobile station and the wireless station based on the ToD of the frame from the wireless station, a ToA of the frame from the wireless station, and at least the timing synchronization information corresponding to the wireless station.

14 Claims, 6 Drawing Sheets

(51) Int. Cl.
*H04W 88/02* (2009.01)
*H04W 88/08* (2009.01)

(56) References Cited

U.S. PATENT DOCUMENTS

| | | | | |
|---|---|---|---|---|
| 2015/0312026 | A1* | 10/2015 | Kim | H04W 56/00 370/338 |
| 2015/0319725 | A1* | 11/2015 | Marshall | H04W 56/0015 370/350 |
| 2016/0080960 | A1* | 3/2016 | Aldana | H04L 43/0858 370/252 |
| 2016/0095075 | A1* | 3/2016 | Bin Sediq | H04W 56/001 370/350 |
| 2016/0291124 | A1* | 10/2016 | Bauer | G01S 5/14 |
| 2016/0330047 | A1* | 11/2016 | Seok | H04L 27/2602 |
| 2017/0188191 | A1* | 6/2017 | Aldana | G01S 5/14 |

OTHER PUBLICATIONS

IEEE Std 802.11ac™—2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.

\* cited by examiner

APPARATUS, SYSTEM AND METHOD OF COMMUNICATING TIMING SYNCHRONIZATION INFORMATION

CROSS REFERENCE

This Application claims the benefit of and priority from U.S. Provisional Patent Application No. 62/319,391 entitled "APPARATUS, SYSTEM AND METHOD OF WIRELESS POSITIONING MEASUREMENT", filed Apr. 7, 2016, the entire disclosure of which is incorporated herein by reference.

TECHNICAL FIELD

Embodiments described herein generally relate to communicating timing synchronization information.

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites. As a result, a lot of effort is being directed towards solving the indoor navigation problem.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
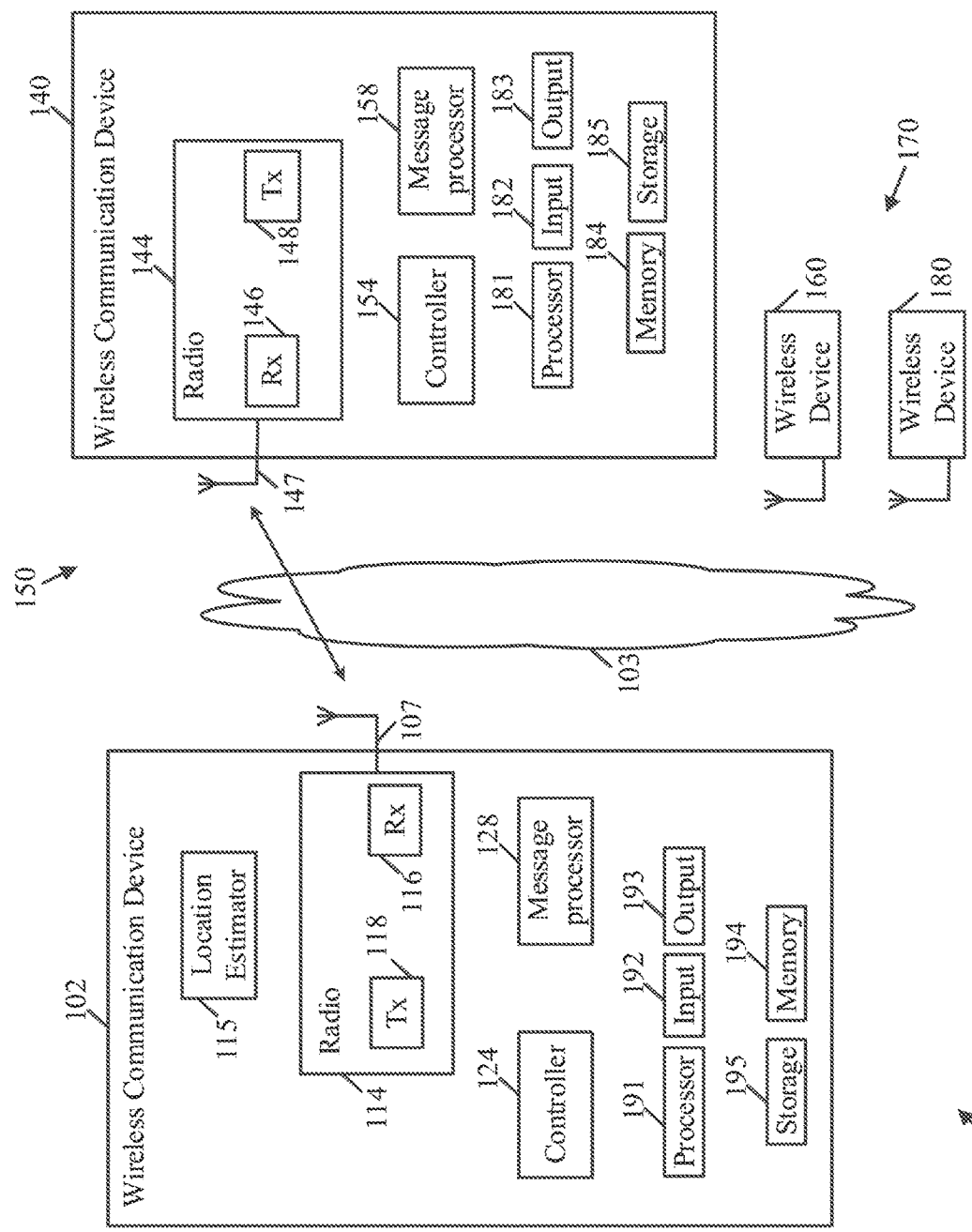
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a lap top computer, a notebook computer, a tablet computer, a server computer, a handheld computer, a handheld device, an Internet of Things (IoT) device, a sensor device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including *IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6*

*GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 December, 2012);* IEEE-802.11REVmc (*"IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"*); and/or IEEE 802.11az (*IEEE 802.11az, Next Generation Positioning*)) and/or future versions and/or derivatives thereof, devices and/or networks operating in accordance with existing WiFi Alliance (WFA) Specifications (including *Wi-Fi Neighbor Awareness Networking (NAN) Technical Specification, Version 1.0, May 1, 2015*) and/or future versions and/or derivatives thereof, devices and/or networks operating in accordance with existing WFA Peer-to-Peer (P2P) specifications (including *WiFi P2P technical specification, version 1.5, Aug. 4, 2014*) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version 1.1 April 2011, Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, a sub 1 GHz (S1G) frequency band, an Extremely High Frequency (EHF) band (the millimeter wave (mmWave) frequency band), e.g., a frequency band within the frequency band of between 20 Ghz and 300 GHZ, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative embodiments.

As shown in FIG. 1, in some demonstrative embodiments, system 100 may include one or more wireless communication devices capable of communicating content, data, information, audio, video, and/or signals via a wireless medium (WM) 103. For example, system 100 may include a wireless communication device 102, and/or a plurality of wireless communication devices 150.

In some demonstrative embodiments, the plurality of wireless communication devices 150 may include a wireless communication device 140 and one or more other wireless communication devices 170, e.g., including wireless communication device 160 and/or wireless communication device 180.

In some demonstrative embodiments, wireless medium 103 may include, for example, a radio channel, an RF channel, a Wireless Fidelity (WiFi) channel, a cellular channel, an IR channel, and the like. One or more elements of system 100 may optionally be capable of communicating over any suitable wired communication links.

In some demonstrative embodiments, device 102 may include a mobile or a portable device.

In some demonstrative embodiments, device 102 may include, for example, a User Equipment (UE), a Mobile device (MD), a wireless Station (STA), a mobile computer, a lap top computer, an Internet of Things (IoT) device, a sensor device, a notebook computer, a tablet computer, an Ultrabook™ computer, a mobile internet device, a handheld computer, a handheld device, a PDA device, a handheld PDA device, an on-board device, an off-board device, a hybrid device (e.g., combining cellular phone functionalities with PDA device functionalities), a consumer device, a mobile or portable device, a mobile phone, a cellular telephone, a PCS device, a PDA device which incorporates a wireless communication device, a mobile or portable GPS device, a relatively small computing device, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Personal Media Player (PMP), a digital video camera (DVC), a gaming device, a Smartphone, or the like.

In some demonstrative embodiments, the plurality of wireless communication devices 150, e.g., wireless devices 140, 160 and/or 180, may include, may perform a role of, and/or may perform the functionality of, an Access Point (AP) station (STA).

In some demonstrative embodiments, device 102 may include, perform a role of, and/or perform the functionality of, a non-AP STA.

In some demonstrative embodiments, the plurality of wireless communication devices 150, e.g., wireless devices 140, 160 and/or 180, may include a non-mobile or a static device. In other embodiments, one or more of devices 150 may include a mobile device.

In some demonstrative embodiments, a device of the plurality of wireless communication devices 150 may include, for example, a desktop computer, a router, a server, and/or any other device configured to perform the functionality of an AP and/or any other functionality.

In some demonstrative embodiments, a device of the plurality of wireless communication devices 150 may include, operate as, or perform the functionality of, a positioning station, for example, a responder station ("responder STA" or "responder").

Some demonstrative embodiments are described herein with respect to a client device performing positioning measurements with respect to an AP. In other embodiments, the client device may perform positioning measurements with respect to any other device, for example, a positioning station, e.g., a responder device, which may or may not have capabilities of an AP, for example, a dedicated responder device, which may be dedicated for wireless positioning, e.g., a dedicated WiFi responder.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195; and/or devices 140, 160 and/or 180 may include, for example, one or more of a processor 181, an input unit 182, an output unit 183, a memory unit 184, and/or a storage unit 185. Devices 102, 140, 160 and/or 180 may optionally include other suitable hardware components and/or software components. In some demonstrative embodiments, some or all of the components of one or more of devices 102, 140, 160 and/or 180 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication medium 103 may include a wireless communication channel over a 2.4 GHz frequency band, a 5 GHz frequency band, a millimeterWave (mmWave) frequency band, e.g., a 60 GHz frequency band, a S1G band, and/or any other frequency band.

In some demonstrative embodiments, wireless communication device 102, and/or wireless communication device 140 may include one or more radios including circuitry and/or logic to perform wireless communication between wireless communication device 102, wireless communication device 140 and/or one or more other wireless communication devices. For example, wireless communication device 102 may include a radio 114, and/or wireless communication device 140 may include a radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a 2.4 GHz band, a 5 GHz band, a S1G band, a directional band, e.g., an mmWave band, and/or any other band.

In some demonstrative embodiments, radios 114 and/or 144 may include, or may be associated with, one or more antennas 107 and/or 147, respectively.

In one example, wireless communication device 102 may include a single antenna 107. In another example, wireless communication device 102 may include two or more antennas 107.

In one example, wireless communication device 140 may include a single antenna 147. In another example, wireless communication device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beam forming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or devices 140, 160 and/or 180 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, wireless communication devices 102 and/or 140 may form, or may communicate as part of, a wireless local area network (WLAN).

In some demonstrative embodiments, wireless communication devices 102 and/or 140 may form, or may communicate as part of, a WiFi network.

In other embodiments, wireless communication devices 102 and/or 140 may form, and/or communicate as part of, any other network.

In some demonstrative embodiments, device 102 may include a location estimator 115 configured to estimate a location of device 102, e.g., as described below.

In some demonstrative embodiments, location estimator 115 may include circuitry and/or logic, e.g., processor circuitry and/or logic, memory circuitry and/or logic, and/or any other circuitry and/or logic, configured to perform the functionality of location estimator 115. Additionally or alternatively, one or more functionalities of location estimator 115 may be implemented by logic, which may be executed by a machine and/or one or more processors, e.g., as described below.

In some demonstrative embodiments, at least part of the functionality of location estimator 115 may be implemented as part of controller 124.

In other embodiments, the functionality of location estimator 115 may be implemented as part of any other element of device 102.

In some demonstrative embodiments, location estimator 115 may be configured to estimate the location of device 102, for example, based on time based range measurements, for example, with device 140 and/or one or more other devices.

In some demonstrative embodiments, location estimator 115 may be configured to determine a location of device 102, for example, using a plurality of ranges from a plurality of other STAs, e.g., by performing trilateration.

In some demonstrative embodiments, the time based range measurements may be performed using WLAN communications, e.g., WiFi. For example, using WiFi to perform the time based range measurements may enable, for example, increasing an indoor location accuracy of the location estimation of device 102, e.g., in an indoor environment.

In some demonstrative embodiments, the time based range measurements may include a round trip time (RTT) measurement (also referred to as Time of Flight (ToF), or Fine Time Measurement (FTM)).

In some demonstrative embodiments, the FTM protocol may be implemented as part of a Specification or protocol, for example, an *IEEE 802.11 Specification*, for example, by a task group dealing with WiFi positioning, e.g., *IEEE 802.11az—Next Generation Positioning*.

In some demonstrative embodiments, devices 102 and/or 140 may be configured to perform, allow, and/or support, positioning, for example, WiFi positioning, e.g., next generation positioning, for example, to be implemented by and/or supported by an *IEEE 802.11 Specification*, e.g., a future *IEEE 802.11az Specification*, and/or any other specification, standard, and/or protocol.

In some demonstrative embodiments, devices 102 and/or 140 may be configured to perform, allow, and/or support, one or more positioning operations configured to allow at least an improved scalability.

In some demonstrative embodiments, the wireless positioning protocol may provide one or more advantages and/or benefits, and/or may solve one or more problems of one or more positioning mechanisms, e.g., as described below.

For example, an FTM protocol, for example, in accordance with an *IEEE 802.11REVmc Specification*, may include a two-sided implementation, which may utilize transmissions exchanged in both ways between a mobile device and an AP. Accordingly, such a two-sided FTM protocol may have a limitation in supporting a very large number of users.

In some demonstrative embodiments, increased scalability may be achieved, for example, by one-sided measurement protocols, in which an AP or a responder transmits, e.g., broadcasts, one or more transmissions, while the AP or the responder is not required to process transmissions from client devices.

In some demonstrative embodiments, a method in which one or more network devices, e.g., APs and/or responders, only transmit, and one or more clients, e.g., mobile devices, only listen may be very attractive in some cases, for example, in cases, which require supporting a large number of users.

In some demonstrative embodiments, one or more methods in which one or more network devices, e.g., APs and/or responders, only transmit may have one or more disadvantages, e.g., as described below.

According to a Time Differential of Arrival (TDoA) method, a client may listen to frames from different APs and, according to the difference in the arrival time of the frames, the client may calculate its position. The disadvantage of this method is that the method requires very accurate network synchronization.

According to a another method, which may be similar to the TDoA method, the client may listen to an FTM transaction between two APs, and the client may estimate the time difference between frames from the two APs. Measuring the time difference over several pairs of APs may give the client an ability to calculate a position of the client. The disadvantage of this method is that the method is performed over only two APs at each time, and the method is very sensitive to a channel condition between the two APs, e.g., a Line of Sight (LOS) between the two APs.

According to an Angle of Departure (AoD) method, the AP may transmit a signal and the client may estimate the AoD from the AP. This method required synchronization between APs transmitting signals and the client.

In some demonstrative embodiments, devices 102, 140, 160 and/or 180 may be configured to implement a measurement method, which may enable network synchronization between APs, e.g., as described below.

In some demonstrative embodiments, devices 102, 140, 160 and/or 180 may be configured to implement a measurement method, which may enable, for example, a network synchronization between APs, for example, even without a master, and/or to use the network synchronization for a one-sided location measurement, e.g., as described below.

In some demonstrative embodiments, an AP in a network, e.g., each AP, for example, device 140, device 160 and/poor device 180, may be configured to measure timing synchronization information including, for example, at least a time and frequency offset between a local clock of the AP and one or more neighbor APs, e.g., all neighbor APs, as described below.

In some demonstrative embodiments, the AP, e.g., device 140, device 160 and/poor device 180, may be configured to publish timing synchronization information, for example, via a neighbor list report, in a beacon of the AP, or using any other additional or alternative message, for example, a broadcast dedicated message, e.g., as described below.

In some demonstrative embodiments, the AP, e.g., device 140, device 160 and/poor device 180, may be configured to broadcast one or more times, e.g., once in a while, for example, periodically, a positioning frame, which may include a time of departure (ToD) of the frame, e.g., measured according to local clock of the AP, for example, device 140, e.g., as described below.

In some demonstrative embodiments, a client device, e.g., device 102, may be configured to receive positioning frames from one or more APs, e.g., from one or more of, or even all of, the plurality of devices 150, e.g., as described below.

In some demonstrative embodiments, the client device, e.g., device 102, may be configured to calculate a TDoA, for example, of the positioning frames, for example, according to the timing synchronization information, e.g., as described below.

In some demonstrative embodiments, the client device, e.g., device 102, may be configured to estimate the location of the client device, for example, based on the TDoA, e.g., even without performing any transmissions to the one or more APs, e.g., as described below.

Some demonstrative embodiments are described herein with respect to a client device performing positioning measurements with respect to an AP. In other embodiments, the client device may perform positioning measurements with respect to any other device, for example, a positioning station, e.g., a responder device, which may or may not have capabilities of an AP, for example, a dedicated responder device, which may be dedicated for wireless positioning, e.g., a dedicated WiFi responder.

In some demonstrative embodiments, a wireless station of the plurality of wireless communication devices 150, e.g., each of the devices 150 or at least one of the devices 150, may be configured to measure timing synchronization information between a local clock of the wireless station and one or more other wireless stations of the plurality of wireless stations 150.

In some demonstrative embodiments, device 140 may be configured to measure timing synchronization information between a local clock of device 140 and one or more clocks of the one or more other wireless stations 170.

In some demonstrative embodiments, controller 154 may be configured to control, cause and/or trigger device 140 to measure the timing synchronization information between the local clock of device 140 and the one or more other wireless stations 170, e.g., as described below.

In some demonstrative embodiments, the timing synchronization information may include one or more entries corresponding to the one or more other wireless stations 170, respectively, e.g., as described below.

In some demonstrative embodiments, an entry corresponding to an other wireless station of wireless stations 170, e.g., device 160, may include one or more synchronization parameters corresponding to a synchronization offset between the local clock of device 140 and a clock of the other device, e.g., device 160, as described below.

In some demonstrative embodiments, the one or more synchronization parameters may include a clock offset between the local clock of device 140 and the clock of device 160, a clock offset accuracy of the clock offset, and/or a last synchronization time between the local clock of device 140 and the clock of device 160, e.g., as described below.

In some demonstrative embodiments, the one or more synchronization parameters may include a parts per million (ppm) frequency offset between the local clock of device 140 and the clock of device 160, and/or an accuracy of the ppm frequency offset, e.g., as described below.

In some demonstrative embodiments, the one or more synchronization parameters may include a change rate of the ppm frequency offset, and/or an accuracy of the change rate of the ppm frequency offset, e.g., as described below.

In some demonstrative embodiments, device 140 may determine the timing synchronization information between the local clock of device 140 and a clock of an other wireless station of the plurality of wireless stations 150, e.g., device 160, for example, based on one or more Time of Flight (ToF) measurements between device 140 and the other wireless station, e.g., as described below.

In some demonstrative embodiments, controller 154 may be configured to control, cause and/or trigger device 140 to determine the timing synchronization information between the local clock of device 140 and a clock of device 160, for example, based on one or more ToF measurements between devices 140 and 160, e.g., as described below.

Figure 2:
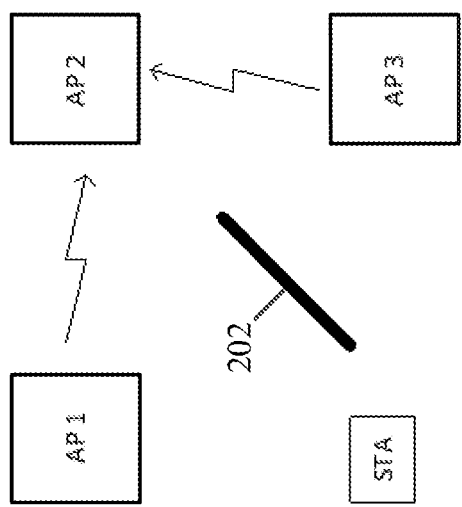
FIG. 2 is a schematic illustration of a network including three access points (APs) and a mobile station (STA), in accordance with some demonstrative embodiments.

Reference is made to FIG. 2, which schematically illustrate a network including three access points (APs), denoted AP1, AP2, and AP3, and a mobile station (STA), in accordance with some demonstrative embodiments. For example, the mobile STA may perform the functionality of device 102 (FIG. 1), and/or AP1, AP2, and/or AP3 may perform the functionality of devices 140, 160, and/or 180, respectively.

In some demonstrative embodiments, as shown in FIG. 2, the AP1 may have a Line of Sight (LoS) with the AP2, and the AP3 may have a LoS with the AP2.

In some demonstrative embodiments, as shown in FIG. 2, an obstacle 202 may be between the AP3 and the AP1 and, accordingly, the AP1 and the AP3 may not be able to synchronize time accurately.

In some demonstrative embodiments, the AP1 may perform a ranging measurement, for example, an FTM measurement, with the AP2, and may be able to determine the timing synchronization information between the local clock of AP1 and the clock of AP2, for example, including at least a clock offset and a parts per million (ppm) offset between AP1 and AP2.

In some demonstrative embodiments, the AP2 may perform a ranging measurement, for example, an FTM measurement, with AP1 and/or AP3, and may be able to determine the timing synchronization information between the local clock of AP2 and the clocks of AP1 and/or AP3, for example, including at least a clock offset and a parts per million (ppm) offset between AP2 and AP1 and/or AP3.

In some demonstrative embodiments, the AP3 may perform a ranging measurement, for example, an FTM measurement, with the AP2, and may be able to determine the timing synchronization information between the local clock of AP3 and the clock of AP2, for example, including at least a clock offset and a parts per million (ppm) offset between AP3 and AP2.

In some demonstrative embodiments, a channel having a bad condition between two APs may be identified, for example, if an FTM measurement over the channel is not consistent with an actual range between the two APs.

In some demonstrative embodiments, the AP1, the AP2, and/or the AP3 may store the timing synchronization information, e.g., in the form of a synchronization table, including the timing synchronization information corresponding to one or more neighboring APs.

In some demonstrative embodiments, AP1 may store the timing synchronization information, e.g., in a form of a synchronization table, including the timing synchronization information corresponding to AP2, e.g., as follows:

TABLE 1

| MAC | ppm offset | ppm offset accuracy | ppm offset change rate | ppm offset change rate accuracy | Clock offset | Clock offset accuracy | Last synchronization time (local time) |
|---|---|---|---|---|---|---|---|
| AP2 | ppm12 | ppmA12 | dppm12 | dppmA12 | co12 | coA12 | tlast12 |

In some demonstrative embodiments, AP2 may store the timing synchronization information, e.g., in a form of a synchronization table, including the timing synchronization information corresponding to AP1 and AP3, e.g., as follows:

TABLE 2

| MAC | ppm offset | ppm offset accuracy | ppm offset change rate | ppm offset change rate accuracy | Clock offset | Clock offset accuracy | Last synchronization time (local time) |
|---|---|---|---|---|---|---|---|
| AP1 | ppm21 | ppmA21 | dppm21 | dppmA21 | co21 | coA21 | tlast21 |
| AP3 | ppm23 | ppmA23 | dppm23 | dppmA23 | co23 | coA23 | tlast23 |

In some demonstrative embodiments, AP3 may store the timing synchronization information, e.g., in a form of a synchronization table, including the timing synchronization information corresponding to AP2, e.g., as follows:

TABLE 3

| MAC | ppm offset | ppm offset accuracy | ppm offset change rate | ppm offset change rate accuracy | Clock offset | Clock offset accuracy | Last synchronization time (local time) |
|---|---|---|---|---|---|---|---|
| AP2 | ppm32 | ppmA32 | dppm32 | dppmA32 | co32 | coA32 | tlast32 |

In some demonstrative embodiments, an AP, e.g., the AP1, the AP2, and/or the AP3, may store the respective synchronization table of the AP, and may publish at least part of the information included in the respective synchronization table of the AP, for example, via one or more frames, for example, a beacon, a positioning frame, any other message, and/or via a server, for example, in higher layers, e.g., as described below.

Referring back to FIG. 1, in some demonstrative embodiments, a wireless station of the plurality of wireless communication devices 150, e.g., device 140, may be configured to transmit a frame including a ToD of the frame according to the local clock of the wireless station.

In one example, the wireless station, e.g., device 140, may transmit the frame including the ToD of the frame, for example, to enable a mobile device, e.g., device 102, to perform a one-sided location measurement, e.g., based on the frame.

In some demonstrative embodiments, a wireless station of the plurality of wireless communication devices 150, e.g., device 140, may be configured to transmit the timing synchronization information corresponding to the local clock of the wireless station.

In one example, the wireless station may transmit the frame including the timing synchronization information, for example, to enable a mobile device to perform a one-sided location measurement with the wireless station and one or more other wireless stations, e.g., based on the timing synchronization information.

In some demonstrative embodiments, controller 154 may be configured to control, cause and/or trigger device 140 to transmit a frame including a ToD of the frame according to the local clock of device 140.

In some demonstrative embodiments, controller 154 may be configured to control, cause and/or trigger device 140 to transmit the frame one or more times, for example, to periodically transmit, the frame including the ToD. In other embodiments, device 140 may transmit the frame one or more times according to any other periodic or non-periodic scheme.

In some demonstrative embodiments, message processor 158 may be configured to generate the frame including the ToD of the frame, and/or transmitter 148 may be configured to transmit the frame.

In some demonstrative embodiments, controller 154 may be configured to control, cause and/or trigger device 140 to transmit the timing synchronization information, for example, including the timing synchronization information of Table 1, e.g., if device 140 operates as the AP1.

In some demonstrative embodiments, message processor 158 may be configured to process the timing synchronization information, and/or transmitter 148 may be configured to transmit the timing synchronization information.

In some demonstrative embodiments, controller 154 may be configured to control, cause and/or trigger device 140 to include the timing synchronization information and the frame including the ToD in a same transmission, e.g. as described below.

In some demonstrative embodiments, controller 154 may be configured to control, cause and/or trigger device 140 to transmit the timing synchronization information in one or more fields of the frame including the ToD.

In some demonstrative embodiments, controller 154 may be configured to control, cause and/or trigger device 140 to include the timing synchronization information and the frame including the ToD in separate transmissions, e.g., as described below.

In some demonstrative embodiments, controller 154 may be configured to control, cause and/or trigger device 140 to transmit the timing synchronization information in a frame separate from the frame including the ToD of the frame, e.g., before or after the frame including the frame including the ToD of the frame.

In some demonstrative embodiments, the frame including the ToD may include a beacon frame, e.g., a beacon frame from device 140.

In some demonstrative embodiments, the frame including the ToD may include a Non Data Packet (NDP), e.g., an NDP from device 140. For example, the ToD of the NDP may be sent in an announcement of the NDP.

In some demonstrative embodiments, the frame including the ToD may include a positioning frame, e.g., an FTM frame from device 140.

In some demonstrative embodiments, a mobile station, e.g., device 102 may be configured to listen for and/or detect frames including ToDs and/or frames including timing synchronization information from one or more different APs, e.g., frames including Table 1, Table 2, or Table 3, and/or any other form of the timing synchronization information.

In some demonstrative embodiments, a mobile station, e.g., device 102 may be configured to calculate a ToF difference between the frames including ToDs, which were sent from the different APs, and to calculate a position of device 102, for example, based on the time of flight difference, e.g., as described below.

In some demonstrative embodiments, device 102 may be configured to process a plurality of frames including ToDs from the plurality of wireless stations 150, e.g., as described below.

In some demonstrative embodiments, controller 124 may be configured to control, cause and/or trigger device 102 to process the plurality of frames from the plurality of wireless stations 150.

In some demonstrative embodiments, a frame from a wireless station of the plurality of wireless stations 150, e.g., a frame from device 140, may include a ToD of the frame according to a local clock of the wireless station, e.g., a ToD according to the local clock of device 140, e.g., as described above.

In some demonstrative embodiments, controller 124 may be configured to control, cause and/or trigger device 102 to process timing synchronization information corresponding to the plurality of wireless stations 150, e.g., as described below.

In some demonstrative embodiments, controller 124 may be configured to control, cause and/or trigger device 102 to process the timing synchronization information corresponding to a station, e.g., device 140, which may include information to indicate one or more synchronization offsets between a local clock of the station and the one or more other wireless stations, e.g., one or more synchronization offsets between the local clock of device 140 and the one or more other wireless stations 170, as described above. For example, the timing synchronization information corresponding to device 140 may include at least the timing synchronization information of Table 1.

In some demonstrative embodiments, controller 124 may be configured to control, cause and/or trigger device 102 to process a transmission from device 140 including the timing synchronization information corresponding to device 140, for example, if the timing synchronization information and the frame including the ToD are received in separate transmissions, e.g., as described above.

In some demonstrative embodiments, controller 124 may be configured to control, cause and/or trigger device 102 to process the timing synchronization information in one or more fields of the frame including the ToD from device 140, for example, if the timing synchronization information and the frame including the ToD are included in a same transmission, e.g., as described above.

In some demonstrative embodiments, controller 124 may be configured to control, cause and/or trigger device 102 to determine a plurality of Time of Flight (ToF) measurements between device 120 and the plurality of wireless stations 150, e.g., as described below.

In some demonstrative embodiments, controller 124 may be configured to control, cause and/or trigger device 102 to determine a ToF measurement between device 102 and device 140, for example, based on the ToD of the frame from device 140, a Time of Arrival (ToA) of the frame from device 140, and at least the timing synchronization information corresponding to device 140, e.g., as described below.

In some demonstrative embodiments, controller 124 may be configured to control, cause and/or trigger device 102 to determine a plurality of Differential ToF (DToF) measurements, for example, based on the plurality of ToF measurements, e.g., as described below.

In some demonstrative embodiments, controller 124 may be configured to control, cause and/or trigger device 102 to determine a location of the mobile station based on the plurality of DToF measurements, e.g., as described below.

Referring back to FIG. 2, in some demonstrative embodiments, the client STA may receive three respective positioning frames from the AP1, AP2 and AP3.

For example, the client STA may receive a first positioning frame from the AP1 at a first ToA, denoted tsta1, a second positioning frame from the AP2 at a second ToA, denoted tsta2, and/or a third positioning frame from the AP3 at a third ToA denoted tsta3.

In some demonstrative embodiments, the first positioning frame may include a first ToD, denoted tdap1_ap1$clk$, according to a local clock of AP1; the second positioning frame may include a second ToD, denoted tdap2_ap2$clk$, according to a local clock of AP2; and/or the third positioning frame may include a third ToD, denoted tdap3_ap3$clk$, according to a local clock of AP3

In some demonstrative embodiments, the client STA may use the synchronization parameters from the synchronization tables received from the APs, e.g., Table 1, Table 2 and/or Table 3, for example, in order to calculate a time difference, e.g., as described below.

In some demonstrative embodiments, the client STA may be configured to choose one AP, for example, according to the accuracy data, e.g., an AP having a most accurate clock, and/or based on any other criterion, to be a basis for a time line. For example, the client STA may choose the AP1 as a basis for the time line.

In some demonstrative embodiments, a time offset of the client station relative to the selected AP1 may be represented by a time constant, denoted C.

In some demonstrative embodiments, the client station may determine a first TOF value, denoted TOF1, corresponding to the AP1, for example, as the first ToA minus the first ToD of the first positioning frame, for example, after compensating for the clock difference C, e.g., as follows:

$$\text{ToF1}=tsta1+C-tdap1\_ap1clk \quad (1)$$

In some demonstrative embodiments, the client station may determine a second TOF value, denoted TOF2, corresponding to the AP2, for example, by converting the second ToD of the second positioning frame, which may be given in terms of ap2$clk$, into a converted ToD, denoted tdap2_ap1$clk$, which may be in terms of the local clock of AP1, and, for example, by subtracting the converted ToD from the second ToA time, after compensating for the clock difference C, e.g., as follows:

$$tdap2\_ap1clk=[tdap2\_ap2clk+co21+(tdap2\_ap2clk-tlas21)*ppm21/1000000]$$

$$\text{ToF2}=tsta2+C-tdap2\_ap1clk \quad (2)$$

In some demonstrative embodiments, the client station may determine a third TOF value, denoted TOF3, corresponding to the AP3, for example, by converting the third ToD of the third positioning frame, which may be given in terms of ap3$clk$, into a converted ToD, denoted tdap3_ap1$clk$, which may be in terms of the local clock of AP1, and, for example, by subtracting the converted ToD from the third ToA time, after compensating for the clock difference C.

In some demonstrative embodiments, converting the third ToD of the third positioning frame into the converted ToD tdap3_ap1$clk$ may be performed in two steps, for example, a first step to convert the third ToD into an intermediate ToD, denoted tdap3_ap2$clk$, which may be in terms of the local clock of AP2, and a second step to convert the intermediate ToD tdap3_ap2$clk$ into the converted ToD tdap3_ap1$clk$, which may be in terms of the local clock of AP1, e.g., as follows:

Calculating the intermediate ToD tdap3_ap2$clk$, which is in terms of AP2 clock:

$$tdap3\_ap2clk=[tdap3\_ap3clk+co32+(tdap3\_ap3clk-tlast32)*ppm32/1000000]$$

Converting the intermediate ToD tdap3_ap2$clk$ into the AP1 clock:

$$tdap3\_ap1clk=[tdap3\_ap2clk+co21+(tdap3\_ap2clk-tlast21)*ppm21/1000000]$$

$$\text{ToF3}=tsta3+C-tdap3\_ap1clk \quad (3)$$

In some demonstrative embodiments, the client station may be configured to determine one or more DToFs between one or more pairs of two APs, e.g., as described below.

For example, the client station may determine a first DToF, denoted DToF12, with respect to the AP1 and the AP2; a second DToF, denoted DToF13, with respect to the AP1 and the AP3; and/or a third DToF, denoted DToF23, with respect to the AP2 and the AP3, e.g., as follows:

$$\text{DToF12}=\text{ToF1}-\text{ToF2}$$

$$\text{DToF13}=\text{ToF1}-\text{ToF3}$$

$$\text{DToF23}=\text{ToF2}-\text{ToF3} \quad (4)$$

In some demonstrative embodiments, as seen from the Equations 1-4 above, the constant C may be cancelled out during the calculation.

In some demonstrative embodiments, the client station may determine the position of the client station, for example, based on the values of DToF12, DToF13, and/or DToF23.

In some demonstrative embodiments, it may be assumed that the clock of the client STA does not drift too much between measurements. This assumption may, for example, impose a constraint on the timing of transmissions of the positioning frames from the APs. For example, the APs may be configured to transmit the positioning frames, e.g., periodically, for example, close enough in time, e.g., within a predefined time window.

Figure 3:
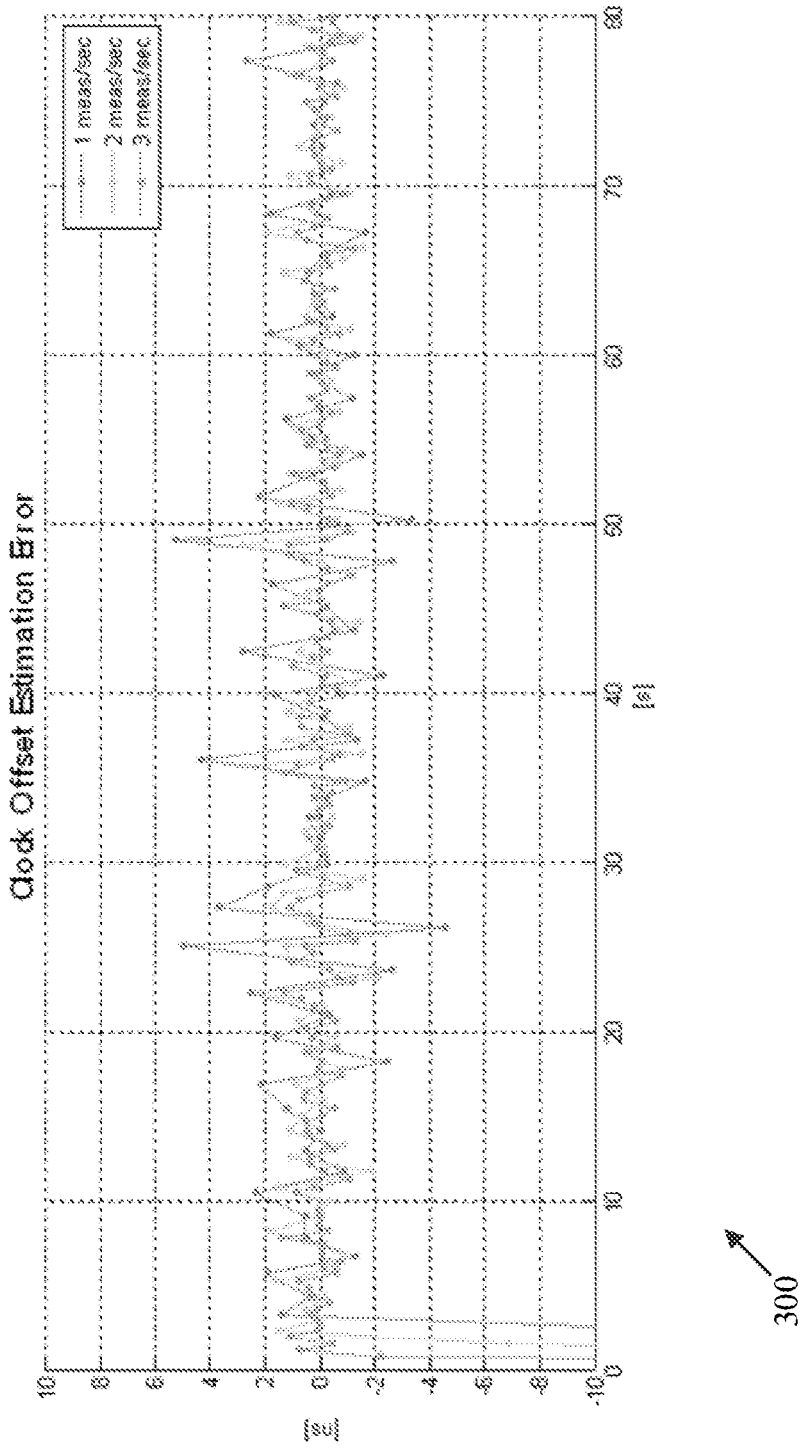
FIG. 3 is a schematic illustration of a graph depicting a clock offset estimation error as a function of measurement rate, in accordance with some demonstrative embodiments.

Reference is made to FIG. 3, which schematically illustrates a graph 300 depicting a clock offset estimation error as a function of measurement rate, in accordance with some demonstrative embodiments.

In one example, the clock offset estimation error of graph 300 may correspond to a WiFi device, e.g., having a low-end clock oscillator.

In some demonstrative embodiments, although low-end clock oscillators may be rated for a 10-20 ppm offset, a clock offset may be relatively stable and may change slightly with temperature.

In some demonstrative embodiments, a Kalman Filter (KF) may be used to track the changes in the clock offset and may predict a clock offset between two stations. The error behavior of that estimation may be determined, e.g., as follows:

$$\text{State: } x = \begin{bmatrix} \text{clock Offset} \\ \text{offset drift (ppm)} \\ \text{change in drift } (d\text{ppm}) \end{bmatrix}$$

Model: $x_{n+1/n} = A * x_{m/n}$, $$\text{where } A = \begin{bmatrix} 1 & \Delta t & \frac{\Delta t^2}{2} \\ 0 & 1 & \Delta t \\ 0 & 0 & 1 \end{bmatrix}$$

wherein Δt denotes a time difference from a previous measurement.

The factors for system noise may be derived, for example, from properties of the oscillator.

As shown in FIG. 3, for a measurement rate of up to three measurements per second, a sub 1 nanosecond (ns) standard deviation (STD) may be achieved for the clock offset estimation error, e.g., even if a low-end clock oscillator is implemented by a station.

In some demonstrative embodiments, an FTM protocol may be used by a station, e.g., device 140, for obtaining a ToD or a ToA, e.g., to calculate the clock offset and/or other synchronization information, e.g., as described above. However, in other embodiments, any other ToF and/or ranging measurement may be used. In one example, one-direction beacon messages may be used, for example, if a ToD of the one-direction beacon messages is transmitted as well, for example, within the one-direction beacon messages, e.g., through wired backhaul or a consequent packet.

In some demonstrative embodiments, the clock offset C may change in time. The value of C may be estimated, for example, using a joint KF with the position estimation, for example, to avoid restricting all measurements to a short timing window, e.g., to keep C roughly constant, as described above.

In some demonstrative embodiments, the timing synchronization capabilities based on the timing synchronization information may be utilized at a client STA, for example, to allow the client STA to determine a position of the client STA, e.g., as described above. Additionally or alternatively, the timing synchronization capabilities may be used in an opposite direction. For example, two or more APs, or even all the APs, may measure the ToA of any packet transmitted from a STA, and all measurements and data may be collected through backhaul, for example, to calculate the position of the STA in s similar manner.

Figure 4:
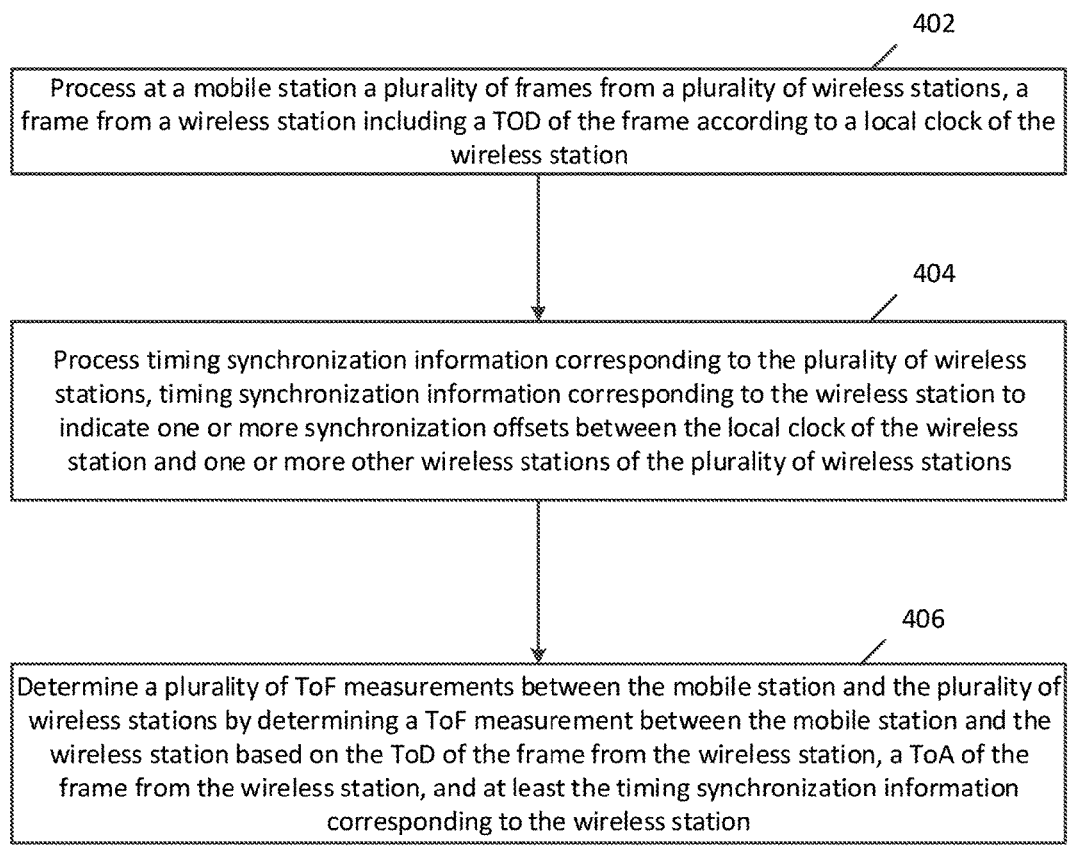
FIG. 4 is a schematic flow-chart illustration of a method of processing timing synchronization information, in accordance with some demonstrative embodiments.

Reference is made to FIG. 4, which schematically illustrates a method of processing timing synchronization information, in accordance with some demonstrative embodiments. For example, one or more of the operations of the method of FIG. 4 may be performed by one or more elements of a system, e.g., system 100 (FIG. 1), for example, one or more wireless devices, e.g., device 102 (FIG. 1) and/or device 140 (FIG. 1); a controller, e.g., controller 124 (FIG. 1) and/or controller 154 (FIG. 1); a radio, e.g., radio 114 (FIG. 1) and/or radio 144 (FIG. 1); a transmitter, e.g., transmitter 118 and/or transmitter 148 (FIG. 1); a receiver e.g., receiver 116, and/or receiver 146 (FIG. 1); a location estimator, e.g., location estimator 115 (FIG. 1); and/or a message processor, e.g., message processor 128 (FIG. 1) and/or message processor 158 (FIG. 1).

As indicated at block 402, the method may include processing a plurality of frames from a plurality of wireless stations, a frame from a wireless station including a ToD of the frame according to a local clock of the wireless station. For example, device 102 (FIG. 1) may process the frame including the ToD from device 140 (FIG. 1), e.g., as described above.

As indicated at block 404, the method may include processing at the mobile station timing synchronization information corresponding to the plurality of wireless stations. For example, the timing synchronization information corresponding to the wireless station may indicate one or more synchronization offsets between the local clock of the wireless station and one or more other wireless stations of the plurality of wireless stations, For example, device 102 (FIG. 1) may process the timing synchronization information corresponding to the plurality of wireless stations 150 (FIG. 1). For example, the timing synchronization information corresponding to device 140 (FIG. 1) may indicate one or more synchronization offsets between the local clock of device 140 (FIG. 1) and one or more other wireless stations 150 (FIG. 1), e.g., as described above.

As indicated at block 406, the method may include determining a plurality of ToF measurements between the mobile station and the plurality of wireless stations by determining a ToF measurement between the mobile station and the wireless station based on the ToD of the frame from the wireless station, a Time of Arrival (ToA) of the frame from the wireless station, and at least the timing synchronization information corresponding to the wireless station. For example, device 102 (FIG. 1) may determine the plurality of ToF measurements between device 102 (FIG. 1) and the plurality of wireless stations 150 (FIG. 1), for example, by determining the ToF measurement between devices 102 and 140 (FIG. 1) based on the ToD of the frame from device 140 (FIG. 1), a Time of Arrival (ToA) of the frame from device 140 (FIG. 1), and at least the timing synchronization information corresponding to device 140 (FIG. 1), e.g., as described above.

Figure 5:
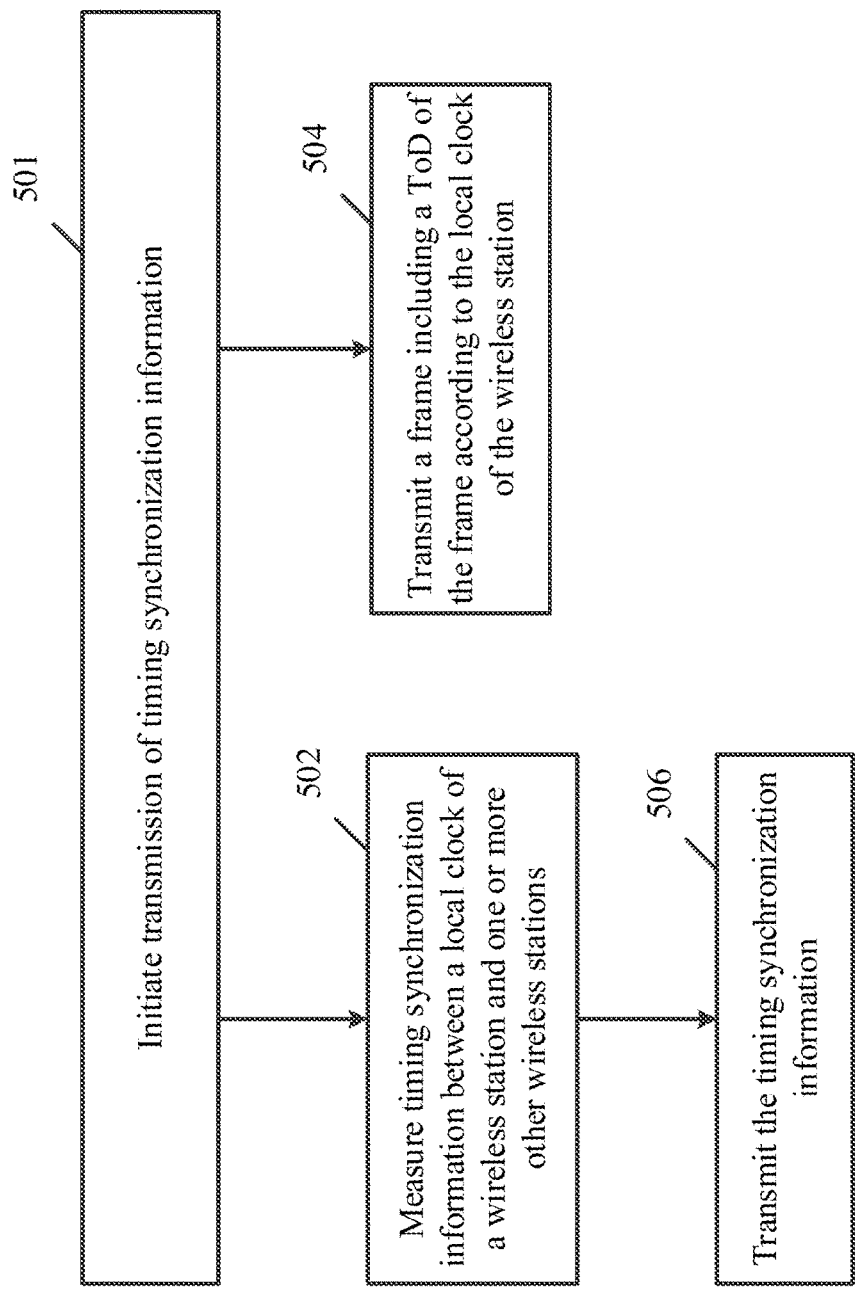
FIG. 5 is a schematic flow-chart illustration of a method of generating and transmitting timing synchronization information, in accordance with some demonstrative embodiments.

Reference is made to FIG. 5, which schematically illustrates a method of generating and transmitting timing synchronization information, in accordance with some demonstrative embodiments. For example, one or more of the operations of the method of FIG. 5 may be performed by one or more elements of a system, e.g., system 100 (FIG. 1), for example, one or more wireless devices, e.g., device 102 (FIG. 1) and/or device 140 (FIG. 1); a controller, e.g., controller 124 (FIG. 1) and/or controller 154 (FIG. 1); a radio, e.g., radio 114 (FIG. 1) and/or radio 144 (FIG. 1); a transmitter, e.g., transmitter 118 and/or transmitter 148 (FIG. 1); a receiver e.g., receiver 116, and/or receiver 146 (FIG. 1); and/or a message processor, e.g., message processor 128 (FIG. 1) and/or message processor 158 (FIG. 1).

As indicated at block 501, the method may include initiating transmission of timing synchronization information. For example, device 140 (FIG. 1) may initiate the transmission of timing synchronization information to synchronize between the local clock of device 140 (FIG. 1) and the one or more other wireless stations 170 (FIG. 1), e.g., as described above.

As indicated at block 502, the method may include measuring timing synchronization information between a local clock of a wireless station and one or more other wireless stations. For example, device 140 (FIG. 1) may measure the timing synchronization information between the local clock of device 140 (FIG. 1) and the one or more other wireless stations 170 (FIG. 1), e.g., as described above.

As indicated at block 506, the method may include transmitting the timing synchronization information. For example, device 140 (FIG. 1) may transmit the timing synchronization information corresponding to device 140 (FIG. 1), e.g., as described above.

As indicated at block 504, the method may include transmitting a frame including a ToD of the frame according to the local clock of the wireless station. For example, device 140 (FIG. 1) may transmit the frame including the ToD of the frame according to the local clock of device 140 (FIG. 1), e.g., as described above.

In some demonstrative embodiments, the frame including the ToD of the frame according to the local clock of the wireless station may be transmitted before or after the timing synchronization information. In other embodiments, the timing synchronization information may be transmitted as part of the frame including the ToD of the frame according to the local clock of the wireless station.

In one example, the frame including the ToD of the frame according to the local clock of the wireless station may be transmitted at a first periodicity, and/or the timing synchronization information may be transmitted at a second periodicity, e.g., equal to or different from the first periodicity.

Figure 6:
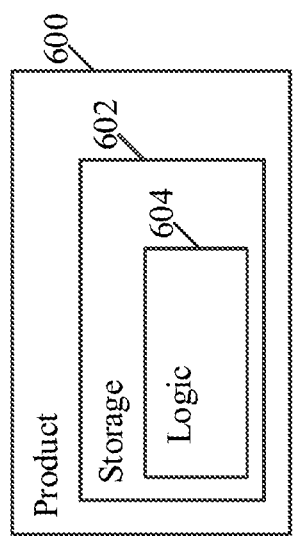
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include one or more tangible computer-readable non-transitory storage media 602, which may include computer-executable instructions, e.g., implemented by logic 604, operable to, when executed by at least one computer processor, enable the at least one computer processor to implement one or more operations at devices 102 and/or 140 (FIG. 1), transmitters 118 and/or 148 (FIG. 1), receivers 116 and/or 146 (FIG. 1), controllers 124 and/or 154 (FIG. 1), message processors 128 and/or 158 (FIG. 1), and/or to perform one or more operations described above with respect to FIGS. 1, 2, 3, 4, and/or 5, and/or one or more operations described herein. The phrase "non-transitory machine-readable medium" is directed to include all computer-readable media, with the sole exception being a transitory propagating signal.

In some demonstrative embodiments, product 600 and/or storage media 602 may include one or more types of computer-readable storage media capable of storing data, including volatile memory, non-volatile memory, removable or non-removable memory, erasable or non-erasable memory, writeable or re-writeable memory, and the like. For example, storage media 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry and logic configured to cause a mobile station to process a plurality of frames from a plurality of wireless stations, a frame from a wireless station comprising a Time of Departure (ToD) of the frame according to a local clock of the wireless station; process timing synchronization information corresponding to the plurality of wireless stations, timing synchronization information corresponding to the wireless station to indicate one or more synchronization offsets between the local clock of the wireless station and one or more other wireless stations of the plurality of wireless stations; and determine a plurality of Time of Flight (ToF) measurements between the mobile station and the plurality of wireless stations by determining a ToF measurement between the mobile station and the wireless station based on the ToD of the frame from the wireless station, a Time of Arrival (ToA) of the frame from the wireless station, and at least the timing synchronization information corresponding to the wireless station.

Example 2 includes the subject matter of Example 1, and optionally, wherein the timing synchronization information corresponding to the wireless station comprises one or more entries corresponding to the one or more other wireless stations, respectively, an entry corresponding to an other wireless station comprising one or more synchronization parameters corresponding to a synchronization offset between the local clock of the wireless station and a clock of the other wireless station.

Example 3 includes the subject matter of Example 2, and optionally, wherein the one or more synchronization parameters comprise at least a clock offset between the local clock of the wireless station and the clock of the other wireless station, a clock offset accuracy of the clock offset, and a last synchronization time between the local clock of the wireless station and the clock of the other wireless station.

Example 4 includes the subject matter of Example 3, and optionally, wherein the one or more synchronization parameters comprise at least a parts per million (ppm) frequency offset between the local clock of the wireless station and the clock of the other wireless station, and an accuracy of the ppm frequency offset.

Example 5 includes the subject matter of Example 4, and optionally, wherein the one or more synchronization parameters comprise at least a change rate of the ppm frequency offset, and an accuracy of the change rate of the ppm frequency offset.

Example 6 includes the subject matter of any one of Examples 1-5, and optionally, wherein the apparatus is configured to cause the mobile station to process a transmission from the wireless station comprising the timing synchronization information corresponding to the wireless station.

Example 7 includes the subject matter of Example 6, and optionally, wherein the apparatus is configured to cause the mobile station to process the timing synchronization information in one or more fields of the frame comprising the ToD from the wireless station.

Example 8 includes the subject matter of Example 6, and optionally, wherein the apparatus is configured to cause the mobile station to process the timing synchronization information in a frame separate from the frame comprising the ToD from the wireless station.

Example 9 includes the subject matter of any one of Examples 1-8, and optionally, wherein the frame comprising the ToD comprises a beacon frame from the wireless station.

Example 10 includes the subject matter of any one of Examples 1-8, and optionally, wherein the frame comprising the ToD comprises a Non Data Packet (NDP) from the wireless station.

Example 11 includes the subject matter of any one of Examples 1-8, and optionally, wherein the frame comprising the ToD comprises a positioning frame from the wireless station.

Example 12 includes the subject matter of any one of Examples 1-11, and optionally, wherein the apparatus is configured to cause the mobile station to determine a plurality of Differential ToF (DToF) measurements based on the plurality of ToF measurements.

Example 13 includes the subject matter of Example 12, and optionally, wherein the apparatus is configured to cause the mobile station to determine a location of the mobile station based on the plurality of DToF measurements.

Example 14 includes the subject matter of any one of Examples 1-13, and optionally, wherein the plurality of wireless stations comprises one or more Access Points (APs).

Example 15 includes the subject matter of any one of Examples 1-14, and optionally, comprising one or more antennas, a memory, and a processor.

Example 16 includes a system of wireless communication comprising a mobile station, the mobile station comprising one or more antennas; a memory; a processor; and a controller configured to cause the mobile station to process a plurality of frames from a plurality of wireless stations, a frame from a wireless station comprising a Time of Departure (ToD) of the frame according to a local clock of the wireless station; process timing synchronization information corresponding to the plurality of wireless stations, timing synchronization information corresponding to the wireless station to indicate one or more synchronization offsets between the local clock of the wireless station and one or more other wireless stations of the plurality of wireless stations; and determine a plurality of Time of Flight (ToF) measurements between the mobile station and the plurality of wireless stations by determining a ToF measurement between the mobile station and the wireless station based on the ToD of the frame from the wireless station, a Time of Arrival (ToA) of the frame from the wireless station, and at least the timing synchronization information corresponding to the wireless station.

Example 17 includes the subject matter of Example 16, and optionally, wherein the timing synchronization information corresponding to the wireless station comprises one or more entries corresponding to the one or more other wireless stations, respectively, an entry corresponding to an other wireless station comprising one or more synchronization parameters corresponding to a synchronization offset between the local clock of the wireless station and a clock of the other wireless station.

Example 18 includes the subject matter of Example 17, and optionally, wherein the one or more synchronization parameters comprise at least a clock offset between the local clock of the wireless station and the clock of the other wireless station, a clock offset accuracy of the clock offset, and a last synchronization time between the local clock of the wireless station and the clock of the other wireless station.

Example 19 includes the subject matter of Example 18, and optionally, wherein the one or more synchronization parameters comprise at least a parts per million (ppm) frequency offset between the local clock of the wireless station and the clock of the other wireless station, and an accuracy of the ppm frequency offset.

Example 20 includes the subject matter of Example 19, and optionally, wherein the one or more synchronization parameters comprise at least a change rate of the ppm frequency offset, and an accuracy of the change rate of the ppm frequency offset.

Example 21 includes the subject matter of any one of Examples 16-20, and optionally, wherein the controller is configured to cause the mobile station to process a transmission from the wireless station comprising the timing synchronization information corresponding to the wireless station.

Example 22 includes the subject matter of Example 21, and optionally, wherein the controller is configured to cause the mobile station to process the timing synchronization information in one or more fields of the frame comprising the ToD from the wireless station.

Example 23 includes the subject matter of Example 21, and optionally, wherein the controller is configured to cause the mobile station to process the timing synchronization information in a frame separate from the frame comprising the ToD from the wireless station.

Example 24 includes the subject matter of any one of Examples 16-23, and optionally, wherein the frame comprising the ToD comprises a beacon frame from the wireless station.

Example 25 includes the subject matter of any one of Examples 16-23, and optionally, wherein the frame comprising the ToD comprises a Non Data Packet (NDP) from the wireless station.

Example 26 includes the subject matter of any one of Examples 16-23, and optionally, wherein the frame comprising the ToD comprises a positioning frame from the wireless station.

Example 27 includes the subject matter of any one of Examples 16-26, and optionally, wherein the controller is configured to cause the mobile station to determine a plurality of Differential ToF (DToF) measurements based on the plurality of ToF measurements.

Example 28 includes the subject matter of Example 27, and optionally, wherein the controller is configured to cause the mobile station to determine a location of the mobile station based on the plurality of DToF measurements.

Example 29 includes the subject matter of any one of Examples 16-28, and optionally, wherein the plurality of wireless stations comprises one or more Access Points (APs).

Example 30 includes a method to be performed at a mobile station, the method comprising processing a plurality of frames from a plurality of wireless stations, a frame from a wireless station comprising a Time of Departure (ToD) of the frame according to a local clock of the wireless station; processing timing synchronization information corresponding to the plurality of wireless stations, timing synchronization information corresponding to the wireless station to indicate one or more synchronization offsets between the local clock of the wireless station and one or more other wireless stations of the plurality of wireless stations; and determining a plurality of Time of Flight (ToF) measurements between the mobile station and the plurality of wireless stations by determining a ToF measurement between the mobile station and the wireless station based on the ToD of the frame from the wireless station, a Time of Arrival (ToA) of the frame from the wireless station, and at least the timing synchronization information corresponding to the wireless station.

Example 31 includes the subject matter of Example 30, and optionally, wherein the timing synchronization information corresponding to the wireless station comprises one or more entries corresponding to the one or more other wireless stations, respectively, an entry corresponding to an other wireless station comprising one or more synchronization parameters corresponding to a synchronization offset between the local clock of the wireless station and a clock of the other wireless station.

Example 32 includes the subject matter of Example 31, and optionally, wherein the one or more synchronization parameters comprise at least a clock offset between the local clock of the wireless station and the clock of the other wireless station, a clock offset accuracy of the clock offset, and a last synchronization time between the local clock of the wireless station and the clock of the other wireless station.

Example 33 includes the subject matter of Example 32, and optionally, wherein the one or more synchronization parameters comprise at least a parts per million (ppm) frequency offset between the local clock of the wireless station and the clock of the other wireless station, and an accuracy of the ppm frequency offset.

Example 34 includes the subject matter of Example 33, and optionally, wherein the one or more synchronization parameters comprise at least a change rate of the ppm frequency offset, and an accuracy of the change rate of the ppm frequency offset.

Example 35 includes the subject matter of any one of Examples 30-34, and optionally, comprising processing a transmission from the wireless station comprising the timing synchronization information corresponding to the wireless station.

Example 36 includes the subject matter of Example 35, and optionally, comprising processing the timing synchronization information in one or more fields of the frame comprising the ToD from the wireless station.

Example 37 includes the subject matter of Example 35, and optionally, comprising processing the timing synchronization information in a frame separate from the frame comprising the ToD from the wireless station.

Example 38 includes the subject matter of any one of Examples 30-37, and optionally, wherein the frame comprising the ToD comprises a beacon frame from the wireless station.

Example 39 includes the subject matter of any one of Examples 30-37, and optionally, wherein the frame comprising the ToD comprises a Non Data Packet (NDP) from the wireless station.

Example 40 includes the subject matter of any one of Examples 30-37, and optionally, wherein the frame comprising the ToD comprises a positioning frame from the wireless station.

Example 41 includes the subject matter of any one of Examples 30-40, and optionally, comprising determining a plurality of Differential ToF (DToF) measurements based on the plurality of ToF measurements.

Example 42 includes the subject matter of Example 41, and optionally, comprising determining a location of the mobile station based on the plurality of DToF measurements.

Example 43 includes the subject matter of any one of Examples 30-42, and optionally, wherein the plurality of wireless stations comprises one or more Access Points (APs).

Example 44 includes a product comprising one or more tangible computer-readable non-transitory storage media comprising computer-executable instructions operable to, when executed by at least one computer processor, enable the at least one computer processor to implement operations at a mobile station, the operations comprising processing a plurality of frames from a plurality of wireless stations, a frame from a wireless station comprising a Time of Departure (ToD) of the frame according to a local clock of the wireless station; processing timing synchronization information corresponding to the plurality of wireless stations, timing synchronization information corresponding to the wireless station to indicate one or more synchronization offsets between the local clock of the wireless station and one or more other wireless stations of the plurality of wireless stations; and determining a plurality of Time of Flight (ToF) measurements between the mobile station and the plurality of wireless stations by determining a ToF measurement between the mobile station and the wireless station based on the ToD of the frame from the wireless station, a Time of Arrival (ToA) of the frame from the wireless station, and at least the timing synchronization information corresponding to the wireless station.

Example 45 includes the subject matter of Example 44, and optionally, wherein the timing synchronization information corresponding to the wireless station comprises one or more entries corresponding to the one or more other wireless stations, respectively, an entry corresponding to an other wireless station comprising one or more synchronization parameters corresponding to a synchronization offset between the local clock of the wireless station and a clock of the other wireless station.

Example 46 includes the subject matter of Example 45, and optionally, wherein the one or more synchronization parameters comprise at least a clock offset between the local clock of the wireless station and the clock of the other wireless station, a clock offset accuracy of the clock offset, and a last synchronization time between the local clock of the wireless station and the clock of the other wireless station.

Example 47 includes the subject matter of Example 46, and optionally, wherein the one or more synchronization parameters comprise at least a parts per million (ppm) frequency offset between the local clock of the wireless station and the clock of the other wireless station, and an accuracy of the ppm frequency offset.

Example 48 includes the subject matter of Example 47, and optionally, wherein the one or more synchronization parameters comprise at least a change rate of the ppm frequency offset, and an accuracy of the change rate of the ppm frequency offset.

Example 49 includes the subject matter of any one of Examples 44-48, and optionally, wherein the operations comprise processing a transmission from the wireless station comprising the timing synchronization information corresponding to the wireless station.

Example 50 includes the subject matter of Example 49, and optionally, wherein the operations comprise processing the timing synchronization information in one or more fields of the frame comprising the ToD from the wireless station.

Example 51 includes the subject matter of Example 49, and optionally, wherein the operations comprise processing the timing synchronization information in a frame separate from the frame comprising the ToD from the wireless station.

Example 52 includes the subject matter of any one of Examples 44-51, and optionally, wherein the frame comprising the ToD comprises a beacon frame from the wireless station.

Example 53 includes the subject matter of any one of Examples 44-51, and optionally, wherein the frame comprising the ToD comprises a Non Data Packet (NDP) from the wireless station.

Example 54 includes the subject matter of any one of Examples 44-51, and optionally, wherein the frame comprising the ToD comprises a positioning frame from the wireless station.

Example 55 includes the subject matter of any one of Examples 44-54, and optionally, wherein the operations comprise determining a plurality of Differential ToF (DToF) measurements based on the plurality of ToF measurements.

Example 56 includes the subject matter of Example 55, and optionally, wherein the operations comprise determining a location of the mobile station based on the plurality of DToF measurements.

Example 57 includes the subject matter of any one of Examples 44-56, and optionally, wherein the plurality of wireless stations comprises one or more Access Points (APs).

Example 58 includes an apparatus of a mobile station, the apparatus comprising means for processing a plurality of frames from a plurality of wireless stations, a frame from a wireless station comprising a Time of Departure (ToD) of the frame according to a local clock of the wireless station; means for processing timing synchronization information corresponding to the plurality of wireless stations, timing synchronization information corresponding to the wireless station to indicate one or more synchronization offsets between the local clock of the wireless station and one or more other wireless stations of the plurality of wireless stations; and means for determining a plurality of Time of Flight (ToF) measurements between the mobile station and the plurality of wireless stations by determining a ToF measurement between the mobile station and the wireless station based on the ToD of the frame from the wireless station, a Time of Arrival (ToA) of the frame from the wireless station, and at least the timing synchronization information corresponding to the wireless station.

Example 59 includes the subject matter of Example 58, and optionally, wherein the timing synchronization information corresponding to the wireless station comprises one or more entries corresponding to the one or more other wireless stations, respectively, an entry corresponding to an other wireless station comprising one or more synchronization parameters corresponding to a synchronization offset between the local clock of the wireless station and a clock of the other wireless station.

Example 60 includes the subject matter of Example 59, and optionally, wherein the one or more synchronization parameters comprise at least a clock offset between the local clock of the wireless station and the clock of the other wireless station, a clock offset accuracy of the clock offset, and a last synchronization time between the local clock of the wireless station and the clock of the other wireless station.

Example 61 includes the subject matter of Example 60, and optionally, wherein the one or more synchronization parameters comprise at least a parts per million (ppm) frequency offset between the local clock of the wireless station and the clock of the other wireless station, and an accuracy of the ppm frequency offset.

Example 62 includes the subject matter of Example 61, and optionally, wherein the one or more synchronization parameters comprise at least a change rate of the ppm frequency offset, and an accuracy of the change rate of the ppm frequency offset.

Example 63 includes the subject matter of any one of Examples 58-62, and optionally, comprising means for processing a transmission from the wireless station comprising the timing synchronization information corresponding to the wireless station.

Example 64 includes the subject matter of Example 63, and optionally, comprising means for processing the timing synchronization information in one or more fields of the frame comprising the ToD from the wireless station.

Example 65 includes the subject matter of Example 63, and optionally, comprising means for processing the timing synchronization information in a frame separate from the frame comprising the ToD from the wireless station.

Example 66 includes the subject matter of any one of Examples 58-65, and optionally, wherein the frame comprising the ToD comprises a beacon frame from the wireless station.

Example 67 includes the subject matter of any one of Examples 58-65, and optionally, wherein the frame comprising the ToD comprises a Non Data Packet (NDP) from the wireless station.

Example 68 includes the subject matter of any one of Examples 58-65, and optionally, wherein the frame comprising the ToD comprises a positioning frame from the wireless station.

Example 69 includes the subject matter of any one of Examples 58-68, and optionally, comprising means for determining a plurality of Differential ToF (DToF) measurements based on the plurality of ToF measurements.

Example 70 includes the subject matter of Example 69, and optionally, comprising means for determining a location of the mobile station based on the plurality of DToF measurements.

Example 71 includes the subject matter of any one of Examples 58-70, and optionally, wherein the plurality of wireless stations comprises one or more Access Points (APs).

Example 72 includes an apparatus comprising circuitry and logic configured to cause a wireless station to measure timing synchronization information between a local clock of the wireless station and one or more other wireless stations; transmit a frame comprising a Time of Departure (ToD) of the frame according to the local clock of the wireless station; and transmit the timing synchronization information.

Example 73 includes the subject matter of Example 72, and optionally, wherein the timing synchronization information comprises one or more entries corresponding to the one or more other wireless stations, respectively, an entry corresponding to an other wireless station comprising one or more synchronization parameters corresponding to a synchronization offset between the local clock and a clock of the other wireless station.

Example 74 includes the subject matter of Example 73, and optionally, wherein the one or more synchronization parameters comprise at least a clock offset between the local clock and the clock of the other wireless station, a clock offset accuracy of the clock offset, and a last synchronization time between the local clock and the clock of the other wireless station.

Example 75 includes the subject matter of Example 74, and optionally, wherein the one or more synchronization parameters comprise at least a parts per million (ppm) frequency offset between the local clock and the clock of the other wireless station, and an accuracy of the ppm frequency offset.

Example 76 includes the subject matter of Example 75, and optionally, wherein the one or more synchronization parameters comprise at least a change rate of the ppm frequency offset, and an accuracy of the change rate of the ppm frequency offset.

Example 77 includes the subject matter of any one of Examples 72-76, and optionally, wherein the apparatus is configured to cause the wireless station to transmit the timing synchronization information in one or more fields of the frame comprising the ToD.

Example 78 includes the subject matter of any one of Examples 72-77, and optionally, wherein the apparatus is configured to cause the wireless station to transmit the timing synchronization information in a frame separate from the frame comprising the ToD.

Example 79 includes the subject matter of any one of Examples 72-78, and optionally, wherein the frame comprising the ToD comprises a beacon frame.

Example 80 includes the subject matter of any one of Examples 72-78, and optionally, wherein the frame comprising the ToD comprises a Non Data Packet (NDP).

Example 81 includes the subject matter of any one of Examples 72-78, and optionally, wherein the frame comprising the ToD comprises a positioning frame.

Example 82 includes the subject matter of any one of Examples 72-81, and optionally, wherein the apparatus is configured to cause the wireless station to periodically transmit the frame comprising the ToD.

Example 83 includes the subject matter of any one of Examples 72-82, and optionally, wherein the apparatus is configured to cause the wireless station to determine timing synchronization information between the local clock and a clock of an other wireless station based on one or more Time of Flight (ToF) measurements between the wireless station and the other wireless station.

Example 84 includes the subject matter of any one of Examples 72-83, and optionally, comprising one or more antennas, a memory and a processor.

Example 85 includes a system of wireless communication comprising a wireless station, the wireless station comprising one or more antennas; a memory; a processor; and a controller configured to cause the wireless station to measure timing synchronization information between a local clock of the wireless station and one or more other wireless stations; transmit a frame comprising a Time of Departure (ToD) of the frame according to the local clock of the wireless station; and transmit the timing synchronization information.

Example 86 includes the subject matter of Example 85, and optionally, wherein the timing synchronization information comprises one or more entries corresponding to the one or more other wireless stations, respectively, an entry corresponding to an other wireless station comprising one or more synchronization parameters corresponding to a synchronization offset between the local clock and a clock of the other wireless station.

Example 87 includes the subject matter of Example 86, and optionally, wherein the one or more synchronization parameters comprise at least a clock offset between the local clock and the clock of the other wireless station, a clock offset accuracy of the clock offset, and a last synchronization time between the local clock and the clock of the other wireless station.

Example 88 includes the subject matter of Example 87, and optionally, wherein the one or more synchronization parameters comprise at least a parts per million (ppm) frequency offset between the local clock and the clock of the other wireless station, and an accuracy of the ppm frequency offset.

Example 89 includes the subject matter of Example 88, and optionally, wherein the one or more synchronization parameters comprise at least a change rate of the ppm frequency offset, and an accuracy of the change rate of the ppm frequency offset.

Example 90 includes the subject matter of any one of Examples 85-89, and optionally, wherein the controller is configured to cause the wireless station to transmit the timing synchronization information in one or more fields of the frame comprising the ToD.

Example 91 includes the subject matter of any one of Examples 85-90, and optionally, wherein the controller is configured to cause the wireless station to transmit the timing synchronization information in a frame separate from the frame comprising the ToD.

Example 92 includes the subject matter of any one of Examples 85-91, and optionally, wherein the frame comprising the ToD comprises a beacon frame.

Example 93 includes the subject matter of any one of Examples 85-91, and optionally, wherein the frame comprising the ToD comprises a Non Data Packet (NDP).

Example 94 includes the subject matter of any one of Examples 85-91, and optionally, wherein the frame comprising the ToD comprises a positioning frame.

Example 95 includes the subject matter of any one of Examples 85-94, and optionally, wherein the controller is configured to cause the wireless station to periodically transmit the frame comprising the ToD.

Example 96 includes the subject matter of any one of Examples 85-95, and optionally, wherein the controller is configured to cause the wireless station to determine timing synchronization information between the local clock and a clock of an other wireless station based on one or more Time of Flight (ToF) measurements between the wireless station and the other wireless station.

Example 97 includes a method to be performed at a wireless station, the method comprising measuring timing synchronization information between a local clock of the wireless station and one or more other wireless stations; transmitting a frame comprising a Time of Departure (ToD) of the frame according to the local clock of the wireless station; and transmitting the timing synchronization information.

Example 98 includes the subject matter of Example 97, and optionally, wherein the timing synchronization information comprises one or more entries corresponding to the one or more other wireless stations, respectively, an entry corresponding to an other wireless station comprising one or more synchronization parameters corresponding to a synchronization offset between the local clock and a clock of the other wireless station.

Example 99 includes the subject matter of Example 98, and optionally, wherein the one or more synchronization parameters comprise at least a clock offset between the local clock and the clock of the other wireless station, a clock offset accuracy of the clock offset, and a last synchronization time between the local clock and the clock of the other wireless station.

Example 100 includes the subject matter of Example 99, and optionally, wherein the one or more synchronization parameters comprise at least a parts per million (ppm) frequency offset between the local clock and the clock of the other wireless station, and an accuracy of the ppm frequency offset.

Example 101 includes the subject matter of Example 100, and optionally, wherein the one or more synchronization parameters comprise at least a change rate of the ppm frequency offset, and an accuracy of the change rate of the ppm frequency offset.

Example 102 includes the subject matter of any one of Examples 97-101, and optionally, comprising transmitting the timing synchronization information in one or more fields of the frame comprising the ToD.

Example 103 includes the subject matter of any one of Examples 97-102, and optionally, comprising transmitting the timing synchronization information in a frame separate from the frame comprising the ToD.

Example 104 includes the subject matter of any one of Examples 97-103, and optionally, wherein the frame comprising the ToD comprises a beacon frame.

Example 105 includes the subject matter of any one of Examples 97-103, and optionally, wherein the frame comprising the ToD comprises a Non Data Packet (NDP).

Example 106 includes the subject matter of any one of Examples 97-103, and optionally, wherein the frame comprising the ToD comprises a positioning frame.

Example 107 includes the subject matter of any one of Examples 97-106, and optionally, comprising periodically transmitting the frame comprising the ToD.

Example 108 includes the subject matter of any one of Examples 97-107, and optionally, comprising determining timing synchronization information between the local clock and a clock of an other wireless station based on one or more Time of Flight (ToF) measurements between the wireless station and the other wireless station.

Example 109 includes a product comprising one or more tangible computer-readable non-transitory storage media comprising computer-executable instructions operable to, when executed by at least one computer processor, enable the at least one computer processor to implement operations at a wireless station, the operations comprising measuring timing synchronization information between a local clock of the wireless station and one or more other wireless stations; transmitting a frame comprising a Time of Departure (ToD) of the frame according to the local clock of the wireless station; and transmitting the timing synchronization information.

Example 110 includes the subject matter of Example 109, and optionally, wherein the timing synchronization information comprises one or more entries corresponding to the one or more other wireless stations, respectively, an entry corresponding to an other wireless station comprising one or more synchronization parameters corresponding to a synchronization offset between the local clock and a clock of the other wireless station.

Example 111 includes the subject matter of Example 110, and optionally, wherein the one or more synchronization parameters comprise at least a clock offset between the local clock and the clock of the other wireless station, a clock offset accuracy of the clock offset, and a last synchronization time between the local clock and the clock of the other wireless station.

Example 112 includes the subject matter of Example 111, and optionally, wherein the one or more synchronization parameters comprise at least a parts per million (ppm) frequency offset between the local clock and the clock of the other wireless station, and an accuracy of the ppm frequency offset.

Example 113 includes the subject matter of Example 112, and optionally, wherein the one or more synchronization parameters comprise at least a change rate of the ppm frequency offset, and an accuracy of the change rate of the ppm frequency offset.

Example 114 includes the subject matter of any one of Examples 109-113, and optionally, wherein the operations comprise transmitting the timing synchronization information in one or more fields of the frame comprising the ToD.

Example 115 includes the subject matter of any one of Examples 109-114, and optionally, wherein the operations comprise transmitting the timing synchronization information in a frame separate from the frame comprising the ToD.

Example 116 includes the subject matter of any one of Examples 109-115, and optionally, wherein the frame comprising the ToD comprises a beacon frame.

Example 117 includes the subject matter of any one of Examples 109-115, and optionally, wherein the frame comprising the ToD comprises a Non Data Packet (NDP).

Example 118 includes the subject matter of any one of Examples 109-115, and optionally, wherein the frame comprising the ToD comprises a positioning frame.

Example 119 includes the subject matter of any one of Examples 109-118, and optionally, wherein the operations comprise periodically transmitting the frame comprising the ToD.

Example 120 includes the subject matter of any one of Examples 109-119, and optionally, wherein the operations comprise determining timing synchronization information between the local clock and a clock of an other wireless station based on one or more Time of Flight (ToF) measurements between the wireless station and the other wireless station.

Example 121 includes an apparatus of a wireless station, the apparatus comprising means for measuring timing synchronization information between a local clock of the wireless station and one or more other wireless stations; means for transmitting a frame comprising a Time of Departure (ToD) of the frame according to the local clock of the wireless station; and means for transmitting the timing synchronization information.

Example 122 includes the subject matter of Example 121, and optionally, wherein the timing synchronization information comprises one or more entries corresponding to the one or more other wireless stations, respectively, an entry corresponding to an other wireless station comprising one or more synchronization parameters corresponding to a synchronization offset between the local clock and a clock of the other wireless station.

Example 123 includes the subject matter of Example 122, and optionally, wherein the one or more synchronization parameters comprise at least a clock offset between the local clock and the clock of the other wireless station, a clock offset accuracy of the clock offset, and a last synchronization time between the local clock and the clock of the other wireless station.

Example 124 includes the subject matter of Example 123, and optionally, wherein the one or more synchronization parameters comprise at least a parts per million (ppm) frequency offset between the local clock and the clock of the other wireless station, and an accuracy of the ppm frequency offset.

Example 125 includes the subject matter of Example 124, and optionally, wherein the one or more synchronization parameters comprise at least a change rate of the ppm frequency offset, and an accuracy of the change rate of the ppm frequency offset.

Example 126 includes the subject matter of any one of Examples 121-125, and optionally, comprising means for transmitting the timing synchronization information in one or more fields of the frame comprising the ToD.

Example 127 includes the subject matter of any one of Examples 121-126, and optionally, comprising means for transmitting the timing synchronization information in a frame separate from the frame comprising the ToD.

Example 128 includes the subject matter of any one of Examples 121-127, and optionally, wherein the frame comprising the ToD comprises a beacon frame.

Example 129 includes the subject matter of any one of Examples 121-127, and optionally, wherein the frame comprising the ToD comprises a Non Data Packet (NDP).

Example 130 includes the subject matter of any one of Examples 121-127, and optionally, wherein the frame comprising the ToD comprises a positioning frame.

Example 131 includes the subject matter of any one of Examples 121-130, and optionally, comprising means for periodically transmitting the frame comprising the ToD.

Example 132 includes the subject matter of any one of Examples 121-131, between the local clock and a clock of an other wireless station based on one or more Time of Flight (ToF) measurements between the wireless station and the other wireless station.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising circuitry and logic configured to cause a mobile station to:
    process a plurality of frames from a plurality of wireless stations, the plurality of frames comprising a first frame from a first wireless station comprising a Time of Departure (ToD) of the first frame according to a local clock of the first wireless station, a second frame from a second wireless station comprising a ToD of the second frame according to a clock of the second wireless station, and a third frame from a third wireless station comprising a ToD of the third frame according to a clock of the third wireless station;
    process timing synchronization information corresponding to the plurality of wireless stations, the timing synchronization information comprising at least information to indicate one or more synchronization offsets between the local clock of the first wireless station and one or more other wireless stations of the plurality of wireless stations;
    determine a plurality of Time of Flight (ToF) measurements between the mobile station and the plurality of wireless stations by determining a first ToF measurement between the mobile station and the first wireless station, determining a second ToF measurement between the mobile station and the second wireless station, and determining a third ToF measurement between the mobile station and the third wireless station, the first ToF measurement is based on the ToD of the first frame, a Time of Arrival (ToA) of the first frame, and at least the information to indicate the one or more synchronization offsets between the local clock of the first wireless station and the one or more other wireless stations;
    determine a plurality of Differential ToF (DToF) measurements based on the plurality of ToF measurements, the plurality of DToF measurements comprising at least a first DToF measurement comprising a difference between the first ToF measurement and the second ToF measurement, a second DToF measurement comprising a difference between the second ToF measurement and the third ToF measurement, and a third DToF measurement comprising a difference between the first ToF measurement and the third ToF measurement; and
    determine a location of the mobile station based on the plurality of DToF measurements.

2. The apparatus of claim 1, wherein the information to indicate the one or more synchronization offsets between the local clock of the first wireless station and the one or more other wireless stations comprises one or more entries corresponding to the one or more other wireless stations, respectively, wherein an entry of the one or more entries corresponding to an other wireless station of the one or more other wireless stations comprises one or more synchronization parameters corresponding to a synchronization offset between the local clock of the first wireless station and a clock of the other wireless station.

3. The apparatus of claim 2, wherein the one or more synchronization parameters comprise at least a clock offset between the local clock of the first wireless station and the clock of the other wireless station, a clock offset accuracy of the clock offset, and a last synchronization time between the local clock of the first wireless station and the clock of the other wireless station.

4. The apparatus of claim 3, wherein the one or more synchronization parameters comprise at least a parts per million (ppm) frequency offset between the local clock of the first wireless station and the clock of the other wireless station, and an accuracy of the ppm frequency offset.

5. The apparatus of claim 4, wherein the one or more synchronization parameters comprise at least a change rate of the ppm frequency offset, and an accuracy of the change rate of the ppm frequency offset.

6. The apparatus of claim 1 configured to cause the mobile station to process a transmission from the first wireless station comprising the information to indicate the one or more synchronization offsets between the local clock of the first wireless station and the one or more other wireless stations.

7. The apparatus of claim 6 configured to cause the mobile station to process one or more fields of the first frame comprising the information to indicate the one or more synchronization offsets between the local clock of the first wireless station and the one or more other wireless stations.

8. The apparatus of claim 6 configured to cause the mobile station to process another frame separate from the first frame from the first wireless station, the another frame comprising the information to indicate the one or more synchronization offsets between the local clock of the first wireless station and the one or more other wireless stations.

9. The apparatus of claim 1, wherein the first frame comprises a Non Data Packet (NDP) from the first wireless station.

10. The apparatus of claim 1, wherein the plurality of wireless stations comprises one or more Access Points (APs).

11. The apparatus of claim 1 comprising one or more antennas, a memory, and a processor.

12. A product comprising one or more tangible computer-readable non-transitory storage media comprising computer-executable instructions operable to, when executed by at least one processor, enable the at least one processor to cause a mobile station to:
  process a plurality of frames from a plurality of wireless stations, the plurality of frames comprising a first frame from a first wireless station comprising a Time of Departure (ToD) of the first frame according to a local clock of the first wireless station, a second frame from a second wireless station comprising a ToD of the second frame according to a clock of the second wireless station, and a third frame from a third wireless station comprising a ToD of the third frame according to a clock of the third wireless station;
  process timing synchronization information corresponding to the plurality of wireless stations, the timing synchronization information comprising at least information to indicate one or more synchronization offsets between the local clock of the first wireless station and one or more other wireless stations of the plurality of wireless stations;
  determine a plurality of Time of Flight (ToF) measurements between the mobile station and the plurality of wireless stations by determining a first ToF measurement between the mobile station and the first wireless station, determining a second ToF measurement between the mobile station and the second wireless station, and determining a third ToF measurement between the mobile station and the third wireless station, the first ToF measurement is based on the ToD of the first frame, a Time of Arrival (ToA) of the first frame, and at least the information to indicate the one or more synchronization offsets between the local clock of the first wireless station and the one or more other wireless stations;
  determine a plurality of Differential ToF (DToF) measurements based on the plurality of ToF measurements, the plurality of DToF measurements comprising at least a first DToF measurement comprising a difference between the first ToF measurement and the second ToF measurement, a second DToF measurement comprising a difference between the second ToF measurement and the third ToF measurement, and a third DToF measurement comprising a difference between the first ToF measurement and the third ToF measurement; and
  determine a location of the mobile station based on the plurality of DToF measurements.

13. The product of claim 12, wherein the information to indicate the one or more synchronization offsets between the local clock of the first wireless station and the one or more other wireless stations comprises one or more entries corresponding to the one or more other wireless stations, respectively, wherein an entry of the one or more entries corresponding to an other wireless station of the one or more other wireless stations comprises one or more synchronization parameters corresponding to a synchronization offset between the local clock of the first wireless station and a clock of the other wireless station.

14. The product of claim 12, wherein the first frame comprises a Non Data Packet (NDP) from the first wireless station.

* * * * *